(12) United States Patent
Cao

(10) Patent No.: US 11,392,001 B2
(45) Date of Patent: Jul. 19, 2022

(54) PIXEL STRUCTURE AND LIQUID CRYSTAL DISPLAY PANEL

(71) Applicant: Shenzhen China Star Optoelectronics Semiconductor Display Technology Co., Ltd., Shenzhen (CN)

(72) Inventor: Wu Cao, Shenzhen (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 16/625,691

(22) PCT Filed: Nov. 6, 2019

(86) PCT No.: PCT/CN2019/115974
§ 371 (c)(1),
(2) Date: Dec. 21, 2019

(87) PCT Pub. No.: WO2020/244142
PCT Pub. Date: Dec. 10, 2020

(65) Prior Publication Data
US 2022/0082892 A1    Mar. 17, 2022

(30) Foreign Application Priority Data

Jun. 5, 2019 (CN) .......................... 201910486362.9

(51) Int. Cl.
*G02F 1/1343* (2006.01)
*G02F 1/1335* (2006.01)
(Continued)

(52) U.S. Cl.
CPC ...... *G02F 1/136222* (2021.01); *G02F 1/1368* (2013.01); *G02F 1/13439* (2013.01); *G02F 1/133514* (2013.01); *G02F 1/134345* (2021.01)

(58) Field of Classification Search
CPC ............. G02F 1/1343; G02F 1/134345; G02F 1/1335; G02F 1/133514; G02F 1/1368;
(Continued)

(56) References Cited

U.S. PATENT DOCUMENTS

2015/0268527 A1*  9/2015 Kwon ............... G02F 1/136286
349/138
2017/0017127 A1    1/2017 Gan
2019/0094634 A1    3/2019 Wang et al.

FOREIGN PATENT DOCUMENTS

CN    101359136 A    2/2009
CN    104808401 A    7/2015
(Continued)

*Primary Examiner* — Thoi V Duong
(74) *Attorney, Agent, or Firm* — Nathan & Associates; Menachem Nathan

(57) ABSTRACT

The present invention provides a pixel structure and a liquid crystal display panel. The pixel structure includes a plurality of sub-pixels and a plurality of pixel electrodes, wherein a boundary of each of the sub-pixels has a hexagonal shape, each of the pixel electrodes includes at least three main electrodes disposed to intersect each other, all of the main electrodes intersect each other at an intersection, and the main electrodes define an area in each of the sub-pixels as a plurality of domains that are independent from each other.

20 Claims, 10 Drawing Sheets

(51) Int. Cl.
*G02F 1/1362* (2006.01)
*G02F 1/1368* (2006.01)

(58) Field of Classification Search
CPC . G02F 1/1362; G02F 1/136222; G02F 1/1357
See application file for complete search history.

(56) References Cited

FOREIGN PATENT DOCUMENTS

| | | |
|---|---|---|
| CN | 105549280 A | 5/2016 |
| CN | 105807519 A | 7/2016 |
| JP | 2003090903 A | 3/2003 |
| KR | 20040021379 A | 3/2004 |

* cited by examiner

PIXEL STRUCTURE AND LIQUID CRYSTAL DISPLAY PANEL

BACKGROUND OF INVENTION

Field of Invention

The present invention relates to a field of display technologies, and in particular, to a pixel structure and a liquid crystal display panel.

Description of Prior Art

In a vertical alignment (VA) liquid crystal display, a pixel electrode on a side of a thin film transistor is patterned, and a long axis of liquid crystal molecules in a pixel unit is perpendicular to a filter in an uncharged state, wherein each pixel unit is divided into many domains, and in a charged state, the liquid crystal molecules in each domain are deflected in respective directions. By this method, the liquid crystal molecules in the same pixel unit are aligned in a plurality of directions, thereby compensating for various viewing angles, further realizing uniform display of the different viewing angles, so as to effectively improve viewing angle characteristics in a gray scale display state of different viewing angles, and prevent color shift.

At present, the VA mode has a large difference in birefringence of liquid crystal molecules at different viewing angles. In order to further improve the color shift, the industry has changed the pixel electrode from a 4-domain structure to an 8-domain structure, which divides one sub-pixel into four main domains and four sub-domains, such that the effect of improving color shift can be achieved due to a voltage difference between the main domains and the sub-domains by action of a plurality of thin film transistors (generally three).

However, since brightness of the sub-domains is not the maximum, an overall transmittance is significantly lowered.

Since the brightness of the sub-domains is not the maximum, the overall transmittance is significantly lowered.

SUMMARY OF INVENTION

A pixel structure, including a plurality of sub-pixels and a plurality of pixel electrodes, wherein a boundary of each of the sub-pixels has a hexagonal shape, each of the pixel electrodes includes at least three main electrodes disposed to intersect each other, all of the main electrodes intersect each other at an intersection, and the main electrodes define an area in each of the sub-pixels as a plurality of domains that are independent from each other.

Further, a bottom edge and a top edge of the boundary of each of the sub-pixels are both horizontally disposed.

Further, each of the pixel electrodes includes three main electrodes and branch electrodes correspondingly connected to the main electrodes, and the main electrodes define the area in each of the sub-pixels as 6 domains.

Further, the domains are in one-to-one correspondence with edges of the boundary of each of the sub-pixels.

Further, the main electrodes defines the area in each of the sub-pixels as a 1st area, a 2nd area, a 3rd area, a 4th area, a 5th area and a 6th area sequentially arranged in a clockwise order; the branch electrodes located in the 1st area and the branch electrodes located in the 4th area are centrosymmetric with respect to the intersection of the main electrodes; the branch electrodes located in the 2nd area and the branch electrodes located in the 5th area are centrosymmetric with respect to the intersection of the main electrodes; and the branch electrodes located in the 3rd area and the branch electrodes located in the 6th area are centrosymmetric with respect to the intersection of the main electrodes.

Further, an angle between the branch electrodes and a bottom edge of the boundary of each of the sub-pixels is a, and when a is an acute angle of 30 to 60 degrees, the branch electrodes in adjacent ones of the domains are not parallel to each other.

Further, each of the pixel electrodes includes four main electrodes and the branch electrodes correspondingly connected to the main electrodes, the main electrodes intersect each other to form a "*" shape, and the main electrodes define the area in each of the sub-pixels as 8 domains.

Further, each of the pixel electrodes includes a 1st main electrode horizontally disposed in a lateral direction and a 2nd main electrode horizontally disposed in a longitudinal direction, and the branch electrodes in one of the domains corresponding to an upper portion of the 1st main electrode and the branch electrodes in one of the domains corresponding to a lower portion of the 1st main electrode are symmetrically distributed with respect to the 1st main electrode.

Further, the main electrodes define the area in each of the sub-pixels as a 1st area, a 2nd area, a 3rd area, a 4th area, a 5th area, a 6th area, a 7th area, and an 8th area sequentially arranged in a clockwise order; the 1st area and the 2nd area correspond to a top edge of the boundary of each of the sub-pixels, the 5th area and the 6th area correspond to a bottom edge of the boundary of each of the sub-pixels, and the 3rd area, the 4th area, the 7th area, and the 8th area are in one-to-one correspondence with sides of the boundary of each of the sub-pixels.

Further, the branch electrodes located in the 1st area and the branch electrodes located in the 5th area are centrosymmetric with respect to the intersection of the main electrodes; the branch electrodes located in the 2nd area and the branch electrodes located in the 6th area are centrosymmetric with respect to the intersection of the main electrodes; the branch electrodes located in the 3rd area and the branch electrodes located in the 7th area are centrosymmetric with respect to the intersection of the main electrodes; and the branch electrodes located in the 4th area and the branch electrodes located in the 8th area are centrosymmetric with respect to the intersection of the main electrodes.

Further, an angle between the branch electrodes and a bottom edge of the boundary of each of the sub-pixels is b, and when b is an acute angle of 30 to 60 degrees, the branch electrodes in adjacent ones of the domains are not parallel to each other.

Further, wherein a distance between a bottom edge and a top edge of the boundary of each of the sub-pixels is greater than a distance between opposite side edges of the boundary of each of the sub-pixels.

Further, the pixel structure includes a red sub-pixel, a green sub-pixel, and a blue sub-pixel, and all of the sub-pixels in the pixel structure are arranged in a honeycomb shape.

Further, a peripheral of each of the sub-pixels is provided with two red sub-pixels, two green sub-pixels, and two blue sub-pixels disposed adjacent thereto, and the sub-pixels located in a same column are all red sub-pixels, green sub-pixels, or blue sub-pixels.

Further, a peripheral of each of the sub-pixels is provided with two red sub-pixels, two green sub-pixels, and two blue sub-pixels disposed adjacent thereto, and the sub-pixels located in a same column are alternately arranged in an order of red, green, and blue.

Further, in an nth column of the sub-pixels, the green sub-pixels and the blue sub-pixels are alternately arranged, and the sub-pixels in an n+1th row are all red sub-pixels; or, in the nth column of the sub-pixels, the red sub-pixels and the blue sub-pixels are alternately arranged, and the sub-pixels in an n+1th row are all green sub-pixels; or, in the nth column of the sub-pixels, the red sub-pixels and the green sub-pixels are alternately arranged, and the sub-pixels in an n+1th row are all blue sub-pixel; wherein n is a positive integer greater than or equal to 1.

The present invention also provides a liquid crystal display panel including a display panel and a pixel structure, wherein the display panel includes a color filter substrate, a thin film transistor substrate, and a liquid crystal layer disposed between the color filter substrate and the thin film transistor substrate; and the pixel structure includes a plurality of sub-pixels and a plurality of pixel electrodes; the boundary of each of the sub-pixels is hexagonal shapeal, each of the pixel electrodes includes at least three main electrodes disposed to intersect each other, all of the main electrodes intersect each other at an intersection, and the main electrodes define an area in each of the sub-pixels as a plurality of domains that are independent from each other.

By setting the sub-pixels into a honeycomb-like hexagonal shape and defining the area in each of the sub-pixels as a plurality of domains by the main electrodes, the viewing angle characteristics in the gray-scale display state of different viewing angles are effectively improved, such that the performance of off-axis color shift is better, the color shift is prevented, and since the pixels are not divided into the main domain and the sub-domain, that is, a number of the thin film transistors is reduced, the objects of no significant decrease on the overall transmittance and no significant deterioration on the aperture ratio can be achieved.

BRIEF DESCRIPTION OF DRAWINGS

In order to more clearly illustrate the embodiments or the technical solutions of the existing art, the drawings illustrating the embodiments or the existing art will be briefly described below. Obviously, the drawings in the following description merely illustrate some embodiments of the present invention. Other drawings may also be obtained by those skilled in the art according to these figures without paying creative work.

Figure 1:
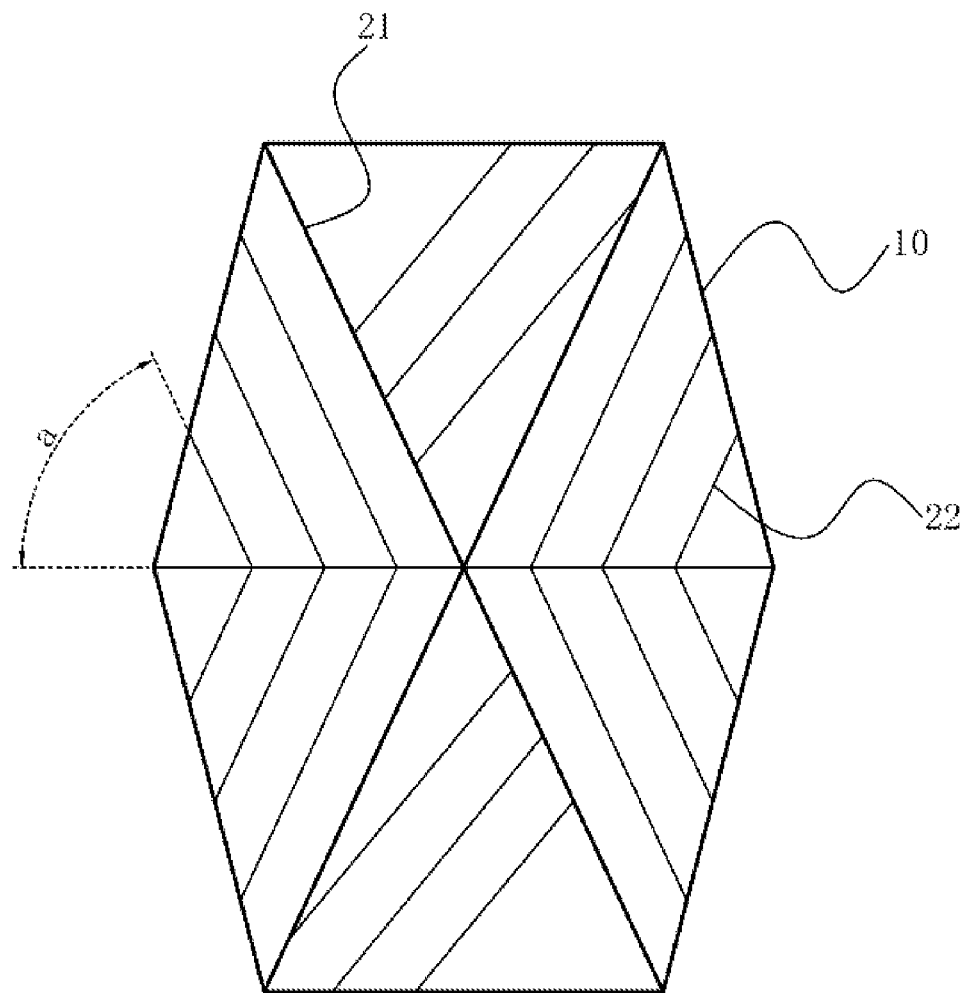
FIG. 1 is a schematic diagram of a pixel structure according to Embodiment 1 of the present invention.

Elements in the drawings are designated by reference numerals listed below.

10, sub-pixel; 20, pixel electrode; 21, main electrode; 22, branch electrode;

31, 1st area; 32, 2nd area; 33, 3rd area; 34, 4th area; 35, 5th area; 36, 6th area;

41, 1st area; 42, 2nd area; 43, 3rd area; 44, 4th area; 45, 5th area; 46, 6th area; 47, 7th area; 48, 8th area;

51, color film substrate; 52, thin film transistor substrate; 53, liquid crystal layer.

DETAILED DESCRIPTION OF PREFERRED EMBODIMENTS

The following description of the various embodiments is provided to illustrate the specific embodiments of the invention. The spatially relative directional terms mentioned in the present invention, such as "upper", "lower", "before", "after", "left", "right", "inside", "outside", "side", etc. and the like, may be used herein for ease of description to describe one element or feature's relationship to another element(s) or feature(s) as illustrated in the figures which are merely references. The spatially relative terms are intended to encompass different orientations in addition to the orientation as depicted in the figures.

The present invention aims to solve technical problems of the prior art liquid crystal display that the overall transmittance is significantly decreased due to a non-maximum brightness of the sub-domains.

Embodiment 1

A pixel structure, as shown in FIG. 1, includes a plurality of sub-pixels 10 and a pixel electrode 20, wherein a boundary of each of the sub-pixels 10 has a hexagonal shape, each of the pixel electrodes 10 includes at least three main electrodes 21 disposed to intersect each other, all of the main electrodes 21 intersect each other at an intersection, and the main electrodes 21 define an area in each of the sub-pixels 10 as a plurality of domains that are independent from each other.

It should be noted that the intersection of the main electrodes 21 coincides with a vertical projection of a geometric center point of each of the sub-pixels 10 in a vertical direction, and the hexagonal shape formed by the boundary of each the sub-pixels 10 is symmetrical in a horizontal axis and a vertical axis passing through the geometric center point of each of the sub-pixels 10.

By setting the sub-pixels into a honeycomb-like hexagonal shape and defining the area in each of the sub-pixels as a plurality of domains by the main electrodes, the viewing angle characteristics in the gray-scale display state of different viewing angles are effectively improved, such that the performance of off-axis color shift is better, the color shift is prevented, and since the pixels are not divided into the main domain and the sub-domain, that is, a number of the thin film transistors is reduced, the objects of no significant decrease on the overall transmittance and no significant deterioration on the aperture ratio can be achieved.

Specifically, a bottom edge and a top edge of the boundary of each of the sub-pixels 10 are both horizontally disposed to facilitate the signal routing, such as the arrangement and routing of the scan lines.

Specifically, each of the pixel electrodes 20 includes three main electrodes 21 and branch electrodes 22 correspondingly connected to the main electrodes 21, and the main electrodes 21 define the area in each of the sub-pixels 10 as 6 domains.

It should be noted that areas of the domains may be equal or not equal.

Further, the domains are in one-to-one correspondence with edges of the boundary of each of the sub-pixels 10, that is, the hexagonal shape formed by the boundary of each of the sub-pixels 10 has six sides, and one domain is disposed corresponding to one side.

Figure 2:
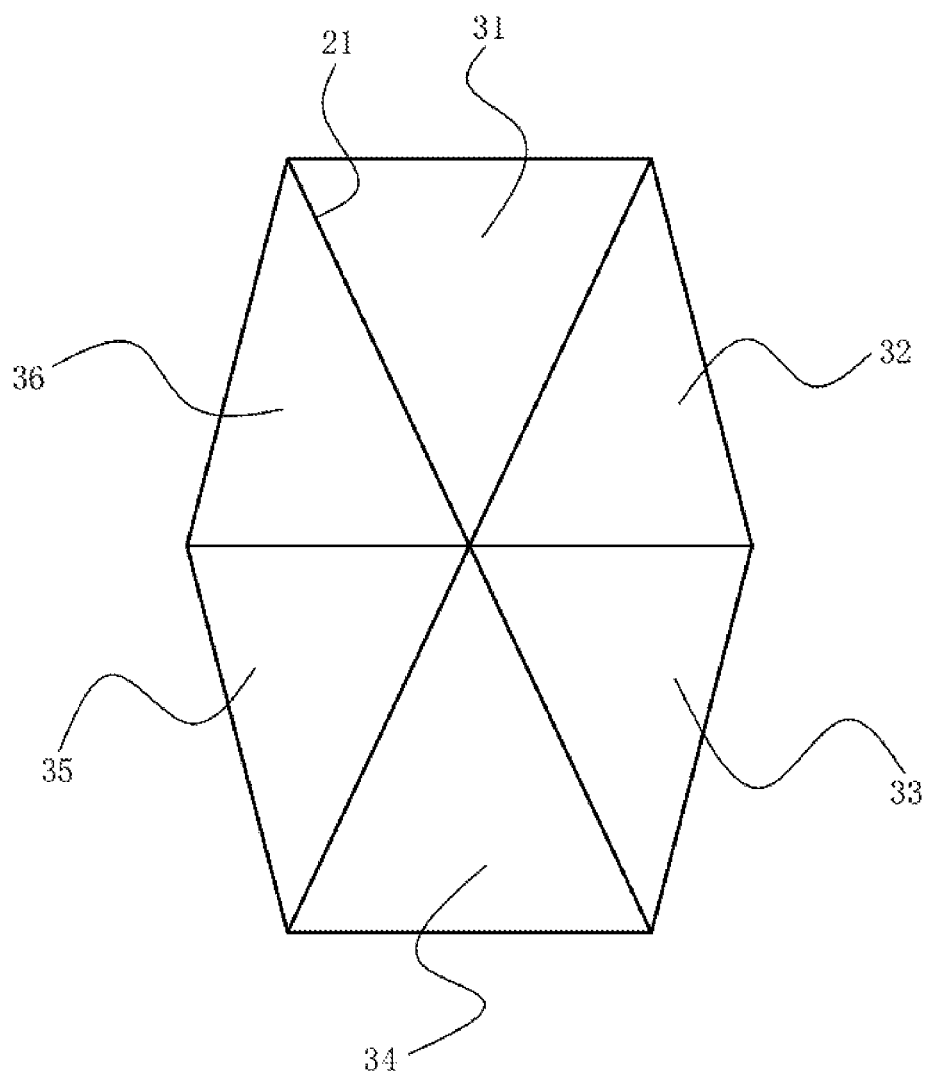
FIG. 2 is a schematic diagram showing a distribution of domains according to Embodiment 1 of the present invention.

Specifically, as shown in FIG. 1 and FIG. 2, the main electrode 21 defines the area in each of the sub-pixel 10 as a 1st area 31, a 2nd area 32, a 3rd area 33, a 4th area 34, a 5th area 35, and a 6th area 36 sequentially arranged in a clockwise order.

The branch electrodes located in the 1st area 31 and the branch electrodes 22 located in the 4th area 34 are centrosymmetric with respect to the intersection of the main electrodes; the branch electrodes 22 located in the 2nd area 32 and the branch electrodes 22 located in the 5th area 35 are centrosymmetric with respect to the intersection of the main electrodes; and the branch electrodes 22 located in the 3rd area 33 and the branch electrodes 22 located in the 6th area 36 are centrosymmetric with respect to the intersection of the main electrodes.

Specifically, an angle between the branch electrodes 22 and a bottom edge of the boundary of each of the sub-pixels 10 is a, and when a is an acute angle of 30 to 60 degrees.

The branch electrodes 22 in the same one of the domains are parallel to each other, and branch electrodes 22 in adjacent ones of the domains are not parallel to each other.

In an embodiment, in order to obtain a better transmittance, the angle between all the branch electrodes 22 and the bottom edge of the boundary of each of the sub-pixels 10 is 45 degrees.

It should be noted that, in actual implementation, considering the risk of liquid crystal alignment and dark lines between different domains, the angles between the branch electrodes 22 located in different domains and the bottom edge of the boundary of each of the sub-pixels 10 may also be different.

Specifically, a spacing between a bottom edge and a top edge of the boundary of each of the sub-pixels 10 is greater than a spacing between opposite side edges of the boundary of each of the sub-pixels 10.

In order to control a distance between the signal lines such as the data lines and the scan lines, the sub-pixels 10 are set to be slim shapes of varying lengths and widths.

Figure 3:
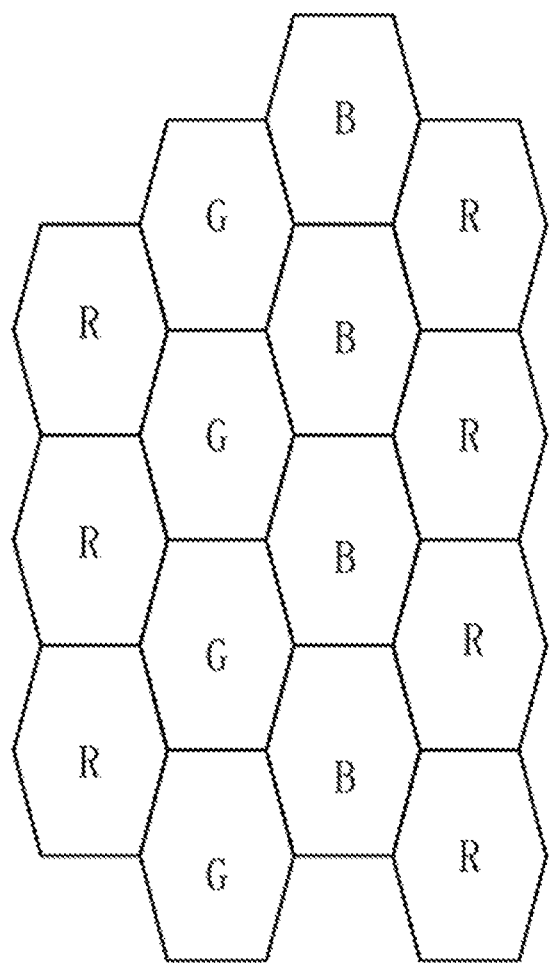
FIG. 3 is a schematic diagram showing an arrangement of sub-pixels according to a 1st example of the present invention.

As shown in FIG. 3, the pixel structure includes a red sub-pixel (hereinafter referred to as "R sub-pixel"), a green sub-pixel (hereinafter referred to as "G sub-pixel"), and a blue sub-pixel (hereinafter referred to as "B sub-pixel"). All of the sub-pixels 10 in the pixel structure are arranged in a honeycomb shape as a whole.

A peripheral of each of the sub-pixels 10 is provided with two red sub-pixels R, two green sub-pixels G, and two blue sub-pixels B disposed adjacent thereto.

In a 1st example, all of the sub-pixels 10 located in the same column are R sub-pixels, G sub-pixels, or B sub-pixels.

Figure 4:
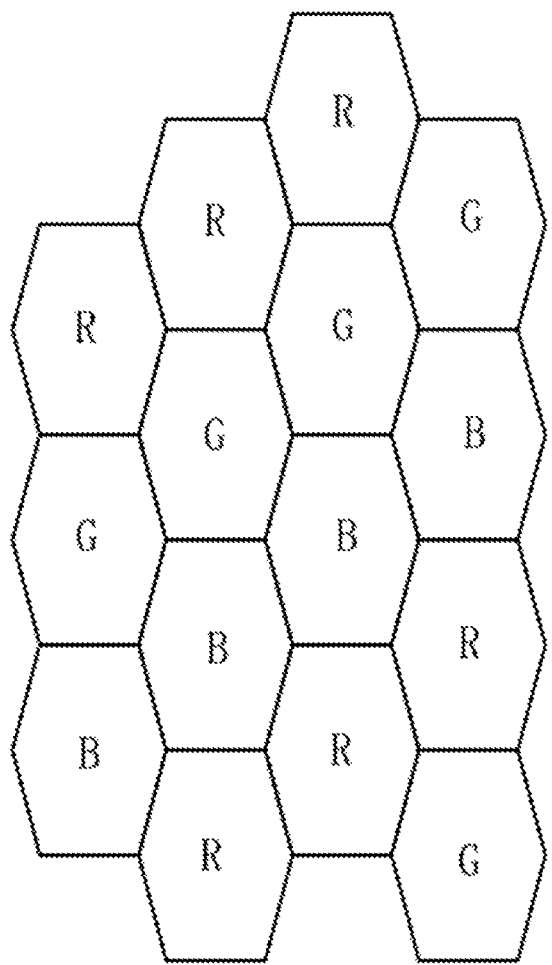
FIG. 4 is a schematic diagram showing an arrangement of sub-pixels according to a 2nd example of the present invention.

In a 2nd example, as shown in FIG. 4, the sub-pixels 10 located in the same column are alternately arranged in order of R sub-pixel, G sub-pixel, and B sub-pixel.

Figure 5:
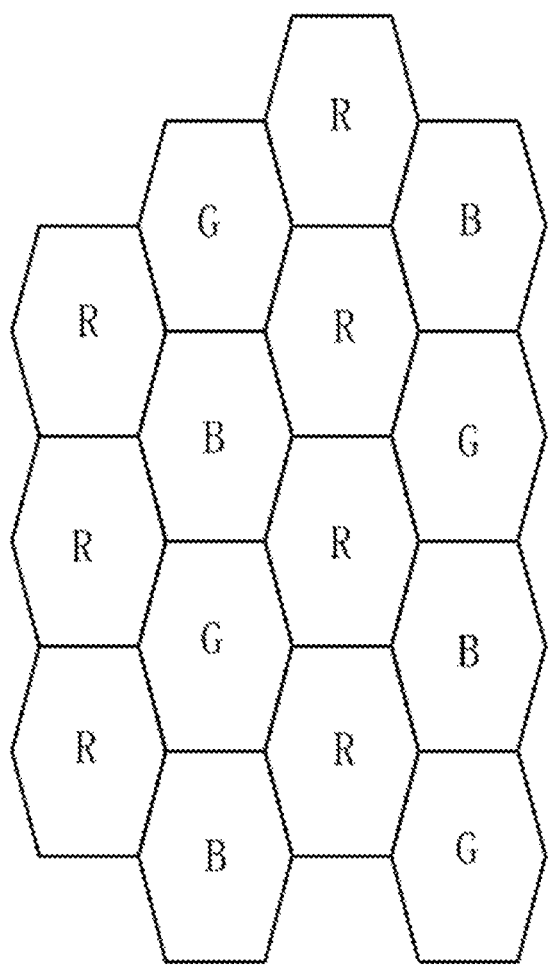
FIG. 5 is a schematic diagram showing an arrangement of sub-pixels according to a 3rd example of the present invention.

In a 3rd example, as shown in FIG. 5, in an nth column of the sub-pixels 10, the G sub-pixels and the B sub-pixels are alternately arranged, and the sub-pixels 10 in an n+1th row are all R sub-pixels, wherein n is a positive integer greater than or equal to 1.

Figure 6:
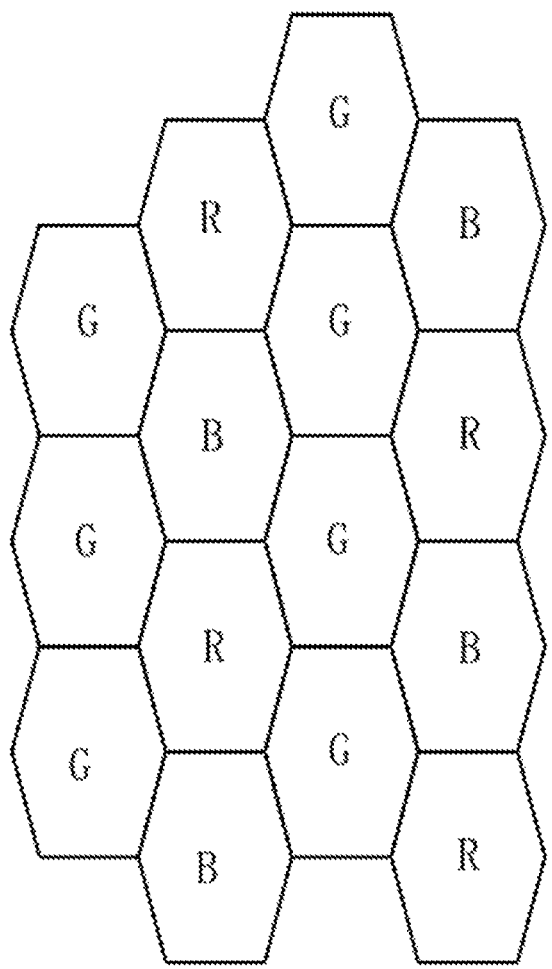
FIG. 6 is a schematic diagram showing an arrangement of sub-pixels according to a 4th example of the present invention.

In the 4th example, as shown in FIG. 6, in the nth column of the sub-pixels 10, the R sub-pixels and the B sub-pixels are alternately arranged, and the sub-pixels 10 in an n+1th row are all G sub-pixels, wherein n is a positive integer greater than or equal to 1.

Figure 7:
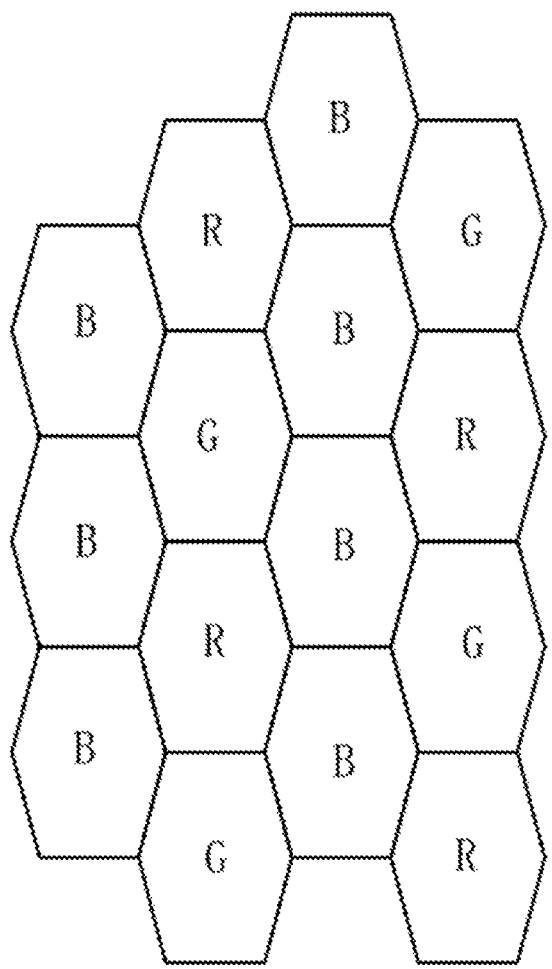
FIG. 7 is a schematic diagram showing an arrangement of sub-pixels according to a 5th example of the present invention.

In the 5th example, as shown in FIG. 7, in the nth column of the sub-pixels 10, the R sub-pixels and the G sub-pixels are alternately arranged, and the sub-pixels 10 in an n+1th row are all B sub-pixels, wherein n is a positive integer greater than or equal to 1.

Embodiment 2

Figure 8:
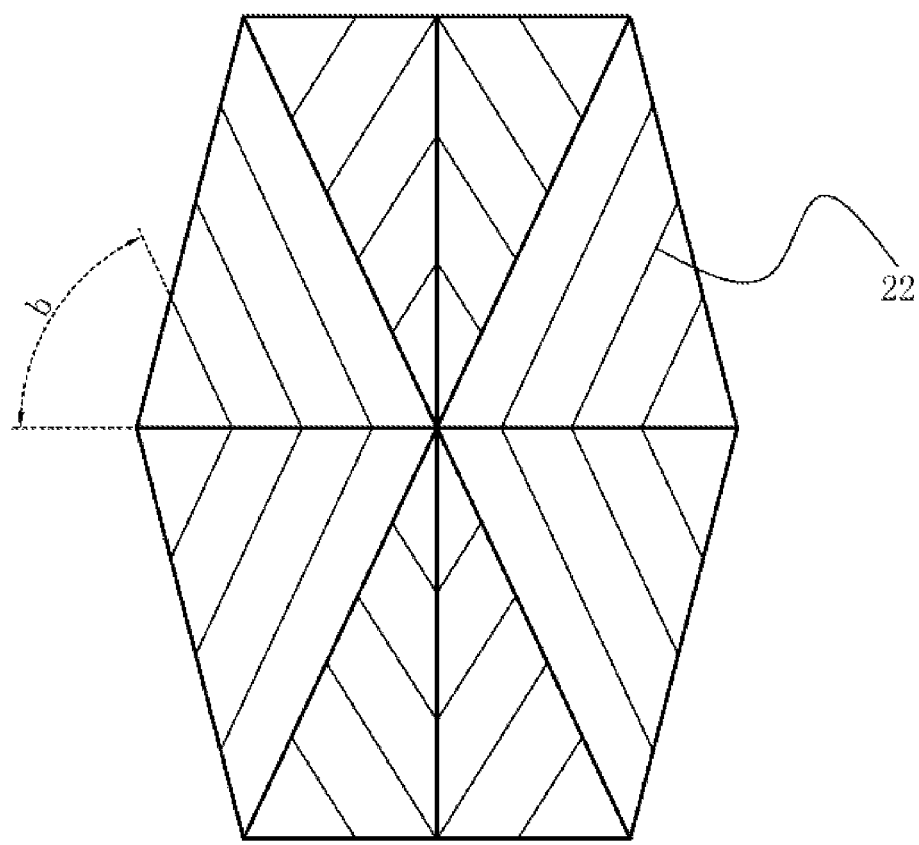
FIG. 8 is a schematic diagram of a pixel structure according to Embodiment 2 of the present invention.

A pixel structure, as shown in FIG. 8, is different from the Embodiment 1 in that a number of the main electrodes 21 and a number of domains in each of the sub-pixels 10 are different.

Specifically, the pixel electrode 20 includes 4 main electrodes 21 and branch electrodes 22 correspondingly connected to the main electrodes 21, the main electrodes 21 intersect each other to form a "*" shape, and the main electrodes 21 define the area in each of the sub-pixels 10 as 8 domains.

Each of the pixel electrodes 10 includes a 1st main electrode 21 horizontally disposed in a lateral direction and a 2nd main electrode 21 horizontally disposed in a longitudinal direction, and the branch electrodes 33 in one of the domains corresponding to an upper portion of the 1st main electrode 21 and the branch electrodes 22 in one of the domains corresponding to a lower portion of the 1st main electrode 21 are symmetrically distributed with respect to the 1st main electrode 21.

Figure 9:
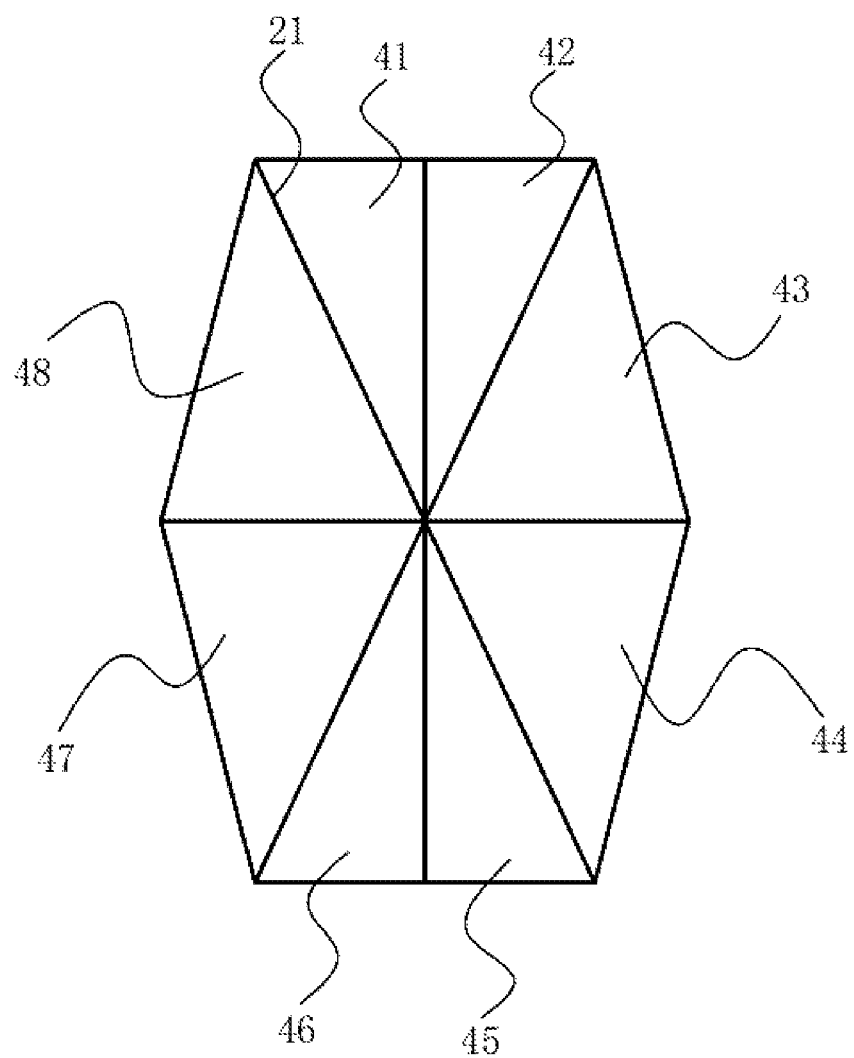
FIG. 9 is a schematic diagram showing a distribution of domains according to Embodiment 2 of the present invention.

Specifically, as shown in FIG. 8 and FIG. 9, the main electrodes 21 define the area in each of the sub-pixels 10 as a 1st area 41, a 2nd area 42, a 3rd area 43, a 4th area 44, a 5th area 45, a 6th area 46, a 7th area 47, and an 8th area 48 sequentially arranged in a clockwise order.

The 1st area 41 and the 2nd area 42 correspond to a top edge of the boundary of each of the sub-pixels 10, the 5th area 45 and the 6th area 46 correspond to a bottom edge of the boundary of each of the sub-pixels 10, and the 3rd area 43, the 4th area 44, the 7th area 47, and the 8th area 48 are in one-to-one correspondence with sides of the boundary of each of the sub-pixels 10.

The branch electrodes 22 located in the 1st area 41 and the branch electrodes 22 located in the 5th area 45 are centrosymmetric with respect to the intersection of the main electrodes 21; the branch electrodes 22 located in the 2nd area 42 and the branch electrodes 22 located in the 6th area 46 are centrosymmetric with respect to the intersection of the main electrodes 21; the branch electrodes 22 located in the 3rd area 43 and the branch electrodes 22 located in the 7th area 47 are centrosymmetric with respect to the intersection of the main electrodes 21; and the branch electrodes 22 located in the 4th area 44 and the branch electrodes 22 located in the 8th area 48 are centrosymmetric with respect to the intersection of the main electrodes 21.

Specifically, an angle between the branch electrodes 22 and a bottom edge of the boundary of each of the sub-pixels 10 is b, and when b is an acute angle of 30 to 60 degrees, the branch electrodes 22 in adjacent ones of the domains are not parallel to each other.

In an embodiment, in order to obtain a better transmittance, the angle between all the branch electrodes 22 and the bottom edge of the boundary of each of the sub-pixels 10 is 45 degrees.

It should be noted that, in actual implementation, considering the risk of liquid crystal alignment and dark lines between different domains, the angles between the branch electrodes 22 located in different domains and the bottom edge of the boundary of each of the sub-pixels 10 may also be different.

Embodiment 3

Figure 10:
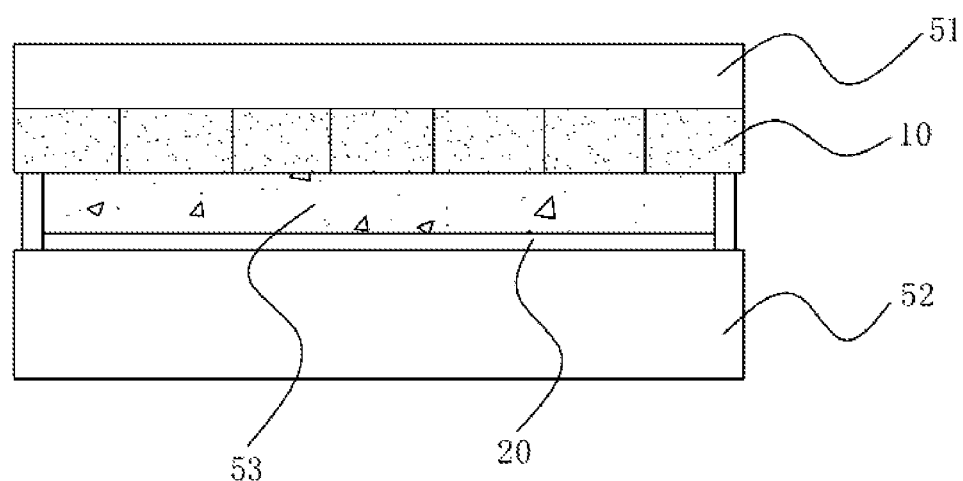
FIG. 10 is a schematic structural diagram of a liquid crystal display panel according to the present invention.

Based on the above pixel structure, the present invention also discloses a liquid crystal display panel including the above pixel structure. As shown in FIG. 10, the liquid crystal display panel includes a display panel and the above pixel structure.

The display panel includes a color filter substrate 51, a thin film transistor substrate 52, and a liquid crystal layer 53 disposed between the color filter substrate 51 and the thin film transistor substrate 52. The pixel structure includes a plurality of sub-pixels 10 disposed on the color filter substrate 51 and a plurality of pixel electrodes 20 disposed on the thin film transistor substrate 52.

The beneficial effects of the present invention are that by setting the sub-pixels into a honeycomb-like hexagonal shape and defining the area in each of the sub-pixels as a plurality of domains by the main electrodes, the viewing angle characteristics in the gray-scale display state of different viewing angles are effectively improved, such that the performance of off-axis color shift is better, the color shift is prevented, and since the pixels are not divided into the main domain and the sub-domain, that is, a number of the thin film transistors is reduced, the objects of no significant decrease on the overall transmittance and no significant deterioration on the aperture ratio can be achieved.

While the invention has been described by way of example and in terms of the preferred embodiments, it is to be understood that the invention is not limited to the disclosed embodiments. To the contrary, it is intended to cover various modifications and similar arrangements. Therefore, the scope of the appended claims should be accorded the broadest interpretation so as to encompass all such modifications and similar arrangements.

What is claimed is:

1. A pixel structure, comprising a plurality of sub-pixels and a plurality of pixel electrodes, wherein a boundary of each of the sub-pixels has a hexagonal shape, each of the pixel electrodes comprises at least three main electrodes disposed to intersect each other, all of the main electrodes intersect each other at an intersection, and the main electrodes define an area in each of the sub-pixels as a plurality of domains that are independent from each other;

wherein a bottom edge and a top edge of the boundary of each of the sub-pixels are both horizontally disposed; and wherein each of the pixel electrodes comprises three main electrodes and branch electrodes correspondingly connected to the main electrodes, and the main electrodes define the area in each of the sub-pixels as 6 domains.

2. The pixel structure according to claim 1, wherein the domains are in one-to-one correspondence with edges of the boundary of each of the sub-pixels.

3. The pixel structure according to claim 2, wherein the main electrodes defines the area in each of the sub-pixels as a 1st area, a 2nd area, a 3rd area, a 4th area, a 5th area and a 6th area sequentially arranged in a clockwise order; the branch electrodes located in the 1st area and the branch electrodes located in the 4th area are centrosymmetric with respect to the intersection of the main electrodes; the branch electrodes located in the 2nd area and the branch electrodes located in the 5th area are centrosymmetric with respect to the intersection of the main electrodes; and the branch electrodes located in the 3rd area and the branch electrodes located in the 6th area are centrosymmetric with respect to the intersection of the main electrodes.

4. The pixel structure according to claim 3, wherein an angle between the branch electrodes and a bottom edge of the boundary of each of the sub-pixels is a, and when a is an acute angle of 30 to 60 degrees, the branch electrodes in adjacent ones of the domains are not parallel to each other.

5. The pixel structure according to claim 1, wherein a distance between a bottom edge and a top edge of the boundary of each of the sub-pixels is greater than a distance between opposite side edges of the boundary of each of the sub-pixels.

6. The pixel structure according to claim 1, wherein the pixel structure comprises a red sub-pixel, a green sub-pixel, and a blue sub-pixel, and all of the sub-pixels in the pixel structure are arranged in a honeycomb shape.

7. The pixel structure according to claim 6, wherein a peripheral of each of the sub-pixels is provided with two red sub-pixels, two green sub-pixels, and two blue sub-pixels disposed adjacent thereto, and the sub-pixels located in a same column are all red sub-pixels, green sub-pixels, or blue sub-pixels.

8. The pixel structure according to claim 6, wherein a peripheral of each of the sub-pixels is provided with two red sub-pixels, two green sub-pixels, and two blue sub-pixels disposed adjacent thereto, and the sub-pixels located in a same column are alternately arranged in an order of red, green, and blue.

9. The pixel structure according to claim 6, wherein in an nth column of the sub-pixels, the green sub-pixels and the blue sub-pixels are alternately arranged, and the sub-pixels in an n+1th row are all red sub-pixels; or, in the nth column of the sub-pixels, the red sub-pixels and the blue sub-pixels are alternately arranged, and the sub-pixels in an n+1th row are all green sub-pixels; or, in the nth column of the sub-pixels, the red sub-pixels and the green sub-pixels are alternately arranged, and the sub-pixels in an n+1th row are all blue sub-pixel; wherein n is a positive integer greater than or equal to 1.

10. A liquid crystal display panel, comprising a display panel and the pixel structure according to claim 1.

11. A pixel structure, comprising a plurality of sub-pixels and a plurality of pixel electrodes, wherein a boundary of each of the sub-pixels has a hexagonal shape, each of the pixel electrodes disposed to intersect each other, all of the main electrodes intersect each other at an intersection, and the main electrodes define an area in each of the sub-pixels as a plurality of domains that are independent from each other;

wherein a bottom edge and a top edge of the boundary of each of the sub-pixels are both horizontally disposed; and wherein each of the pixel electrodes comprises four main electrodes and the branch electrodes correspondingly connected to the main electrodes, the main electrodes intersect each other to form a "*" shape, and the main electrodes define the area in each of the sub-pixels as 8 domains.

12. The pixel structure according to claim 11, wherein each of the pixel electrodes comprises a 1st main electrode horizontally disposed in a lateral direction and a 2nd main electrode horizontally disposed in a longitudinal direction, and the branch electrodes in one of the domains corresponding to an upper portion of the 1st main electrode and the branch electrodes in one of the domains corresponding to a lower portion of the 1st main electrode are symmetrically distributed with respect to the 1st main electrode.

13. The pixel structure according to claim 12, wherein the main electrodes define the area in each of the sub-pixels as a 1st area, a 2nd area, a 3rd area, a 4th area, a 5th area, a 6th area, a 7th area, and an 8th area sequentially arranged in a clockwise order; the 1st area and the 2nd area correspond to a top edge of the boundary of each of the sub-pixels, the 5th area and the 6th area correspond to a bottom edge of the boundary of each of the sub-pixels, and the 3rd area, the 4th area, the 7th area, and the 8th area are in one-to-one correspondence with sides of the boundary of each of the sub-pixels.

14. The pixel structure according to claim 13, wherein the branch electrodes located in the 1st area and the branch electrodes located in the 5th area are centrosymmetric with respect to the intersection of the main electrodes; the branch electrodes located in the 2nd area and the branch electrodes located in the 6th area are centrosymmetric with respect to the intersection of the main electrodes; the branch electrodes located in the 3rd area and the branch electrodes located in the 7th area are centrosymmetric with respect to the intersection of the main electrodes; and the branch electrodes located in the 4th area and the branch electrodes located in the 8th area are centrosymmetric with respect to the intersection of the main electrodes.

15. The pixel structure according to claim 14, wherein an angle between the branch electrodes and a bottom edge of the boundary of each of the sub-pixels is b, and when b is an acute angle of 30 to 60 degrees, the branch electrodes in adjacent ones of the domains are not parallel to each other.

16. The pixel structure according to claim 11, wherein a distance between a bottom edge and a top edge of the boundary of each of the sub-pixels is greater than a distance between opposite side edges of the boundary of each of the sub-pixels.

17. The pixel structure according to claim 11, wherein the pixel structure comprises a red sub-pixel, a green sub-pixel, and a blue sub-pixel, and all of the sub-pixels in the pixel structure are arranged in a honeycomb shape.

18. The pixel structure according to claim 17, wherein a peripheral of each of the sub-pixels is provided with two red sub-pixels, two green sub-pixels, and two blue sub-pixels disposed adjacent thereto, and the sub-pixels located in a same column are all red sub-pixels, green sub-pixels, or blue sub-pixels.

19. The pixel structure according to claim 17, wherein a peripheral of each of the sub-pixels is provided with two red sub-pixels, two green sub-pixels, and two blue sub-pixels disposed adjacent thereto, and the sub-pixels located in a same column are alternately arranged in an order of red, green, and blue.

20. The pixel structure according to claim 17, wherein in an nth column of the sub-pixels, the green sub-pixels and the blue sub-pixels are alternately arranged, and the sub-pixels in an n+1th row are all red sub-pixels; or, in the nth column of the sub-pixels, the red sub-pixels and the blue sub-pixels are alternately arranged, and the sub-pixels in an n+1th row are all green sub-pixels; or, in the nth column of the sub-pixels, the red sub-pixels and the green sub-pixels are alternately arranged, and the sub-pixels in an n+1th row are all blue sub-pixel; wherein n is a positive integer greater than or equal to 1.

* * * * *